United States Patent
Minda

(10) Patent No.: US 11,860,761 B2
(45) Date of Patent: Jan. 2, 2024

(54) DETECTING AND IDENTIFYING ANOMALIES FOR SINGLE PAGE APPLICATIONS

(71) Applicant: Cisco Technology, Inc., San Jose, CA (US)

(72) Inventor: Kunal Minda, Mandsaur (IN)

(73) Assignee: Cisco Technology, Inc., San Jose, CA (US)

( * ) Notice: Subject to any disclaimer, the term of this patent is extended or adjusted under 35 U.S.C. 154(b) by 72 days.

(21) Appl. No.: 17/507,396

(22) Filed: Oct. 21, 2021

(65) Prior Publication Data

US 2023/0128202 A1 Apr. 27, 2023

(51) Int. Cl.
*G06F 11/34* (2006.01)
*H04L 7/02* (2006.01)
*G06F 11/30* (2006.01)

(52) U.S. Cl.
CPC ........ *G06F 11/3495* (2013.01); *G06F 11/302* (2013.01); *H04L 7/02* (2013.01)

(58) Field of Classification Search
CPC ..... G06F 11/3495; G06F 11/302; H04L 67/02
USPC ........................................................ 709/217
See application file for complete search history.

(56) References Cited

U.S. PATENT DOCUMENTS

| | | |
|---|---|---|
| 10,038,736 B2 | 7/2018 | Veeravalli et al. |
| 10,785,281 B1 | 9/2020 | Cath et al. |
| 10,860,939 B2 | 12/2020 | Ryckbosch et al. |
| 10,911,517 B2 | 2/2021 | Jindal et al. |
| 11,075,977 B2 | 7/2021 | Jindal et al. |
| 2011/0295783 A1* | 12/2011 | Zhao ...................... G06F 16/337 706/12 |
| 2020/0265100 A1 | 8/2020 | Hu et al. |
| 2020/0267203 A1* | 8/2020 | Jindal ................... H04L 67/025 |
| 2021/0158187 A1 | 5/2021 | Chavan et al. |

OTHER PUBLICATIONS https://www.collinsdictionary.com/us/dictionary/english/a-number-of.*

* cited by examiner

*Primary Examiner* — Tan Doan
(74) *Attorney, Agent, or Firm* — BEHMKE INNOVATION GROUP LLC; James M. Behmke; James J. Wong

(57) ABSTRACT

In one embodiment, a device obtains page load information corresponding to a loaded web application. The device detects, based on the page load information, an anomalous feature of the loaded web application. The device identifies a type of the anomalous feature based on a number of resource anomalies within the loaded web application, wherein the type of the anomalous feature is selected from a group consisting of: a page anomaly; a resource anomaly; and a domain anomaly. The device performs one or more mitigation actions according to the type of the anomalous feature.

18 Claims, 14 Drawing Sheets

| SAMPLE SNAPSHOTS | PAGE DETAIL 608 | RESOURCES ON PAGE 610 | TIME STAMP OF SS |
|---|---|---|---|
| SAMPLE 1 (602) | Page Pa 612<br>Pa1_VCT(Visual complete time)<br>Pa1_LT(Load Time) | Resource Pa_Ra 614<br>Ra1_DNST (DNS time);<br>Ra1_CT (Connection time);<br>Ra1_LT (load time)<br>Resource Pa_Rb 616<br>Rb1_DNST (DNS time);<br>Rb1_CT (Connection time);<br>Rb1_LT (load time)<br>Resource Pa_Rc 618<br>Rc1_DNST (DNS time);<br>Rc1_CT (connection time);<br>Rc1_LT (load time) | T1 |
| SAMPLE 2 (604) | Page Pa<br>Pa2_VCT(Visual complete time)<br>Pa2_LT(Load Time) | Resource Pa_Ra<br>Ra2_DNST (DNS time);<br>Ra2_CT (Connection time);<br>Ra2_LT (load time)<br>Resource Pa_Rb<br>Rb2_DNST (DNS time);<br>Rb2_CT (Connection time);<br>Rb2_LT (load time)<br>Resource Pa_Rc<br>Rc2_DNST (DNS time);<br>Rc2_CT (Connection time);<br>Rc2_LT (load time) | T1 |
| SAMPLE 3 (606) | Page Pb<br>Pb1_VCT(Visual complete time)<br>Pb1_LT(Load Time) | Resource Pb_Rd<br>Rd2_DNST (DNS time);<br>Rd2_CT (Connection time);<br>Rd2_LT (load time)<br>Resource Pb_Re<br>Re2_DNST (DNS time);<br>Re2_CT (Connection time);<br>Re2_LT (load time)<br>Resource Pb_Rf<br>Rf2_DNST (DNS time);<br>Rf2_CT (Connection time);<br>Rf2_LT (load time) | T2 |

FIG. 6

| NORMALIZED SAMPLE SNAPSHOTS | PAGE DETAIL | RESOURCES ON PAGE | TIME STAMP |
|---|---|---|---|
| NORMALIZED SNAPSHOT 1 _802_ | _804_ Page Pa - Pb Median(Pa1_VCT, Pa2_VCT) = Pa_nVCT Median(Pa1_LT, Pa2_LT) = Pa_nLT ... | Resource Pa_Ra _806_ Median(Ra1_LT, Ra2_LT) = Ra_nLT Load time<br>Resource Pa_Rb _808_ Median(Ra1_LT, Ra2_LT) = Ra_nLT Load time<br>Resource Pa_Rc _810_ Median(Ra1_LT, Ra2_LT) = Ra_nLT Load time<br>Resource Pa_R[n] _812_ ... | T1 |

FIG. 8

ANOMALY DETECTION NOTIFICATION

- TestID:1234 has a slow performing resource
- The target for this test is www.DOMAINB.com
- The slow performing resource is located on Page_Pb
- A single resource anomaly was detected
- The slow performing resource is likely due to a backend server issue

FIG. 10

DETECTING AND IDENTIFYING ANOMALIES FOR SINGLE PAGE APPLICATIONS

TECHNICAL FIELD

The present disclosure relates generally to computer systems, and, more particularly, to detecting and identifying anomalies for single page applications.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

Even with the proliferation of web services, access to these web services oftentimes is still done through end user utilization of a web application (or webpage) is that is connected to or in communication with the web services. Increasingly, single page applications (SPAs) may be loaded at web browsers of end user devices (e.g., desktop computers, laptops, mobile phones, etc.) for accessing the web services. However, traditional performance traditional performance metric monitoring and root cause analysis (based on metrics gathered regarding resource data) techniques are inadequate in that they have not kept up with the newer loading behaviors of SPAs.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 6 illustrates example snapshots that are indicative of loadings of single page applications of a web application;

FIG. 8 illustrates an example normalized snapshot of pages of a web application;

FIG. 10 illustrates an example anomaly detection notification; and

DESCRIPTION OF EXAMPLE EMBODIMENTS

Overview

According to one or more embodiments of the disclosure, a device obtains page load information corresponding to a loaded web application. The device detects, based on the page load information, an anomalous feature of the loaded web application. The device identifies a type of the anomalous feature based on a number of resource anomalies within the loaded web application, wherein the type of the anomalous feature is selected from a group consisting of: a page anomaly; a resource anomaly; and a domain anomaly. The device performs one or more mitigation actions according to the type of the anomalous feature.

In one embodiment, the type of the anomalous feature is: the page anomaly when the number of resource anomalies is zero, the resource anomaly when the number of resource anomalies is one, and the domain anomaly when the number of resource anomalies is greater than one.

In one embodiment, the domain anomaly is: a single domain anomaly when resource anomalies within the loaded web application belong to a particular domain, and a multi-domain anomaly when the resource anomalies belong to a plurality of domains.

Other embodiments are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile AdHoc Network (MANET) is a kind of wireless ad-hoc network, which is generally considered a self-configuring network of mobile routers (and associated hosts) connected by wireless links, the union of which forms an arbitrary topology.

Figure 1:
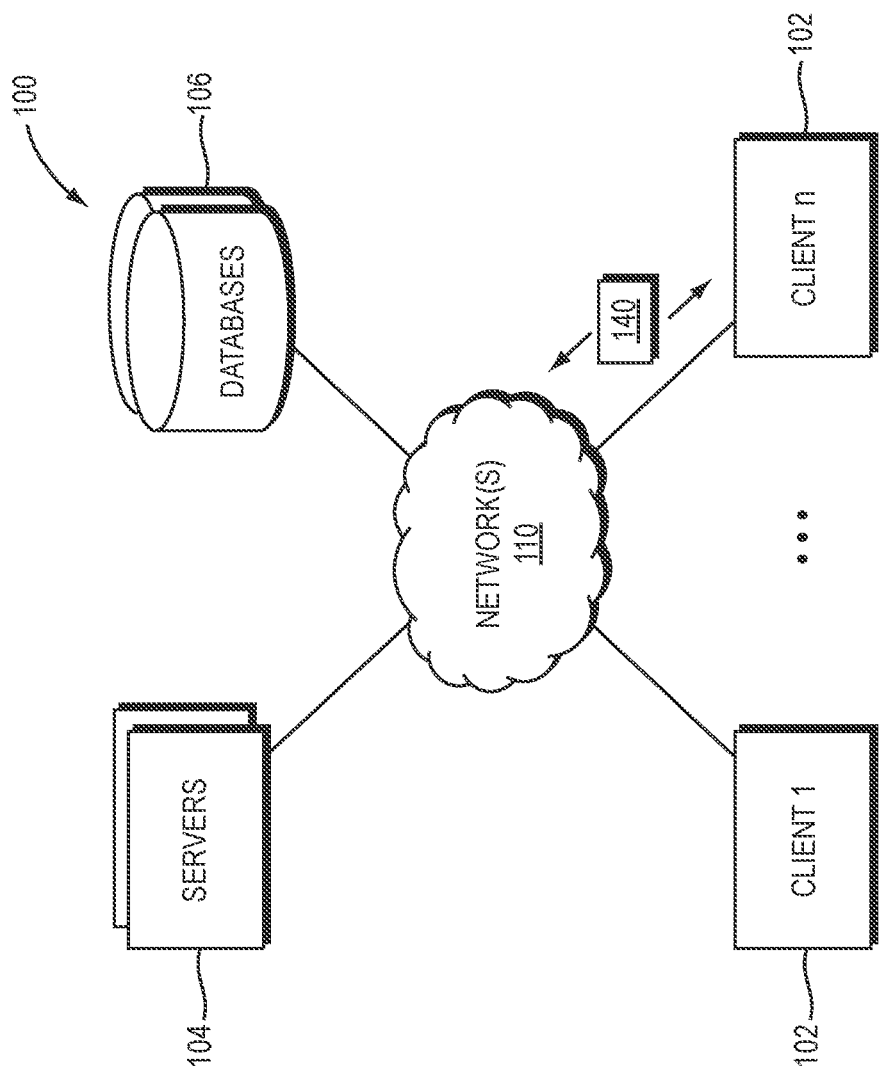
FIG. 1 illustrates an example computer network.

FIG. 1 is a schematic block diagram of an example simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The is nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
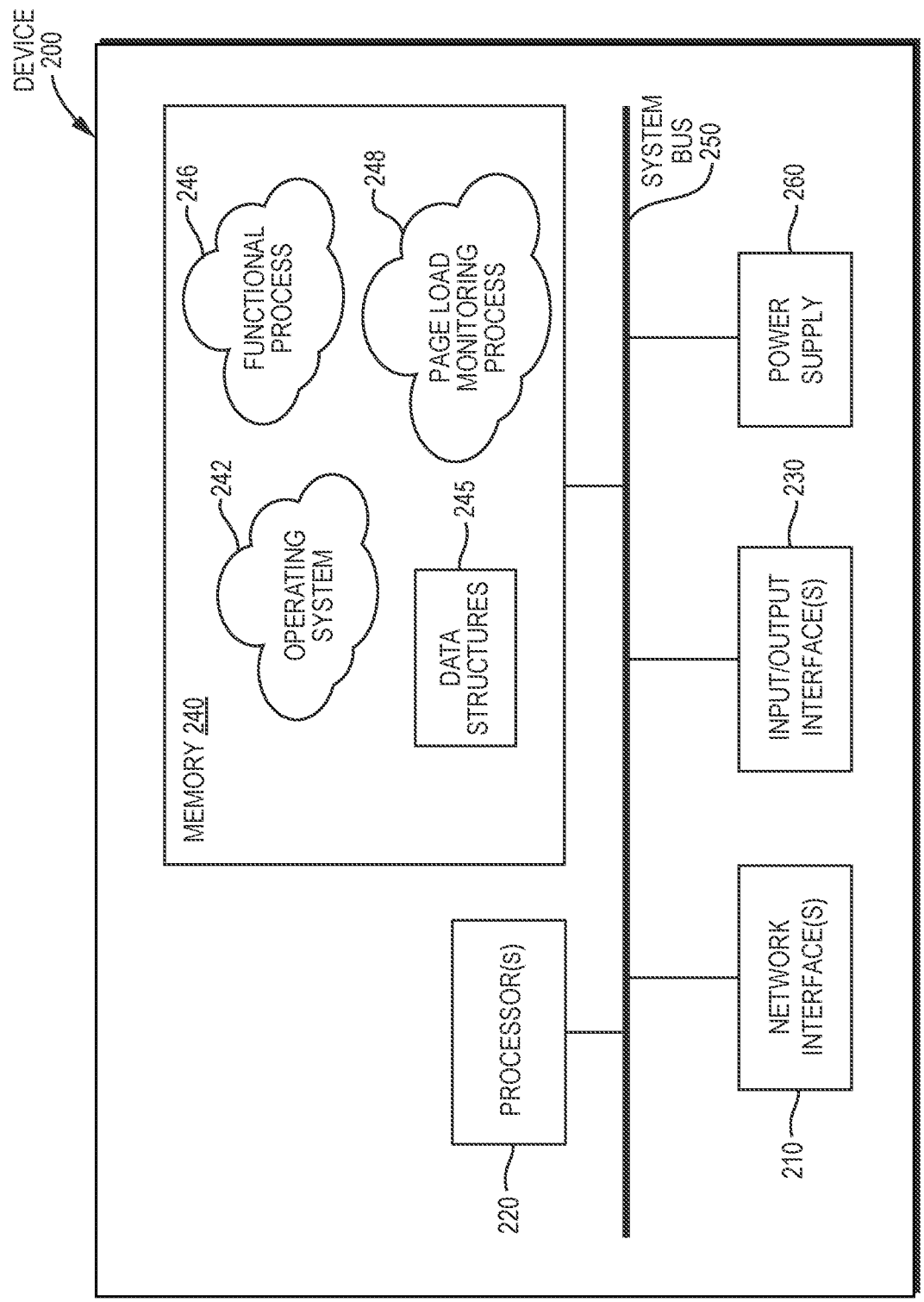
FIG. 2 illustrates an example computing device/node.

FIG. 2 is a schematic block diagram of an example node/device 200 that may be used with one or more embodiments described herein, e.g., as any of the devices 102-106 shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes 246, and on certain devices, an illustrative page load monitoring process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

—Observability Intelligence Platform—

As noted above, distributed applications can generally be delivered using cloud computing techniques. For example, distributed applications can be provided using a cloud computing model, in which users are provided access to application software and is databases over a network. The cloud providers generally manage the infrastructure and platforms (e.g., servers/appliances) on which the applications are executed. Various types of distributed applications can be provided as a cloud service or as a software as a service (SaaS) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet) through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable business demand. Thus, using cloud-based/web-based services can allow a business to reduce Information Technology (IT) operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that troubleshooting performance problems can be very challenging and time consuming. For example, determining whether performance problems are the result of the cloud-based/web-based service provider, the customer's own internal IT network (e.g., the customer's enterprise IT network), a user's client device, and/or intermediate network providers between the user's client device/internal IT network and the cloud-based/web-based service provider of a distributed application and/or web site (e.g., in the Internet) can present significant technical challenges for detection of such networking related performance problems and determining the locations and/or root causes of such networking related performance problems. Additionally, determining whether performance problems are caused by the network or an application itself, or portions of an application, or particular services associated with an application, and so on, further complicate the troubleshooting efforts.

Certain aspects of one or more embodiments herein may thus be based on (or otherwise relate to or utilize) an observability intelligence platform for network and/or application performance management. For instance, solutions are available that allow customers to monitor networks and applications, whether the customers control such networks and applications, or merely use them, where visibility into such resources may generally be based on a suite of "agents" or pieces of software that are installed in different locations in different networks (e.g., around the world).

Specifically, as discussed with respect to illustrative FIG. 3 below, performance within any networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information), among other configured information. The agent-collected data may then be provided to one or more servers or controllers to analyze the data.

Examples of different agents (in terms of location) may comprise cloud agents (e.g., deployed and maintained by the observability intelligence platform provider), enterprise agents (e.g., installed and operated in a customer's network), and endpoint agents, which may be a different version of the previous agents that is installed on actual users' (e.g., employees') devices (e.g., on their web browsers or otherwise). Other agents may specifically be based on categorical configurations of different agent operations, is such as language agents (e.g., Java agents, .Net agents, PHP agents, and others), machine agents (e.g., infrastructure agents residing on the host and collecting information regarding the machine which implements the host such as processor usage, memory usage, and other hardware information), and network agents (e.g., to capture network information, such as data collected from a socket, etc.).

Each of the agents may then instrument (e.g., passively monitor activities) and/or run tests (e.g., actively create events to monitor) from their respective devices, allowing a customer to customize from a suite of tests against different networks and applications or any resource that they're interested in having visibility into, whether it's visibility into that end point resource or anything in between, e.g., how a device is specifically connected through a network to an end resource (e.g., full visibility at various layers), how a website is loading, how an application is performing, how a particular business transaction (or a particular type of business transaction) is being effected, and so on, whether for individual devices, a category of devices (e.g., type, location, capabilities, etc.), or any other suitable embodiment of categorical classification.

Figure 3:
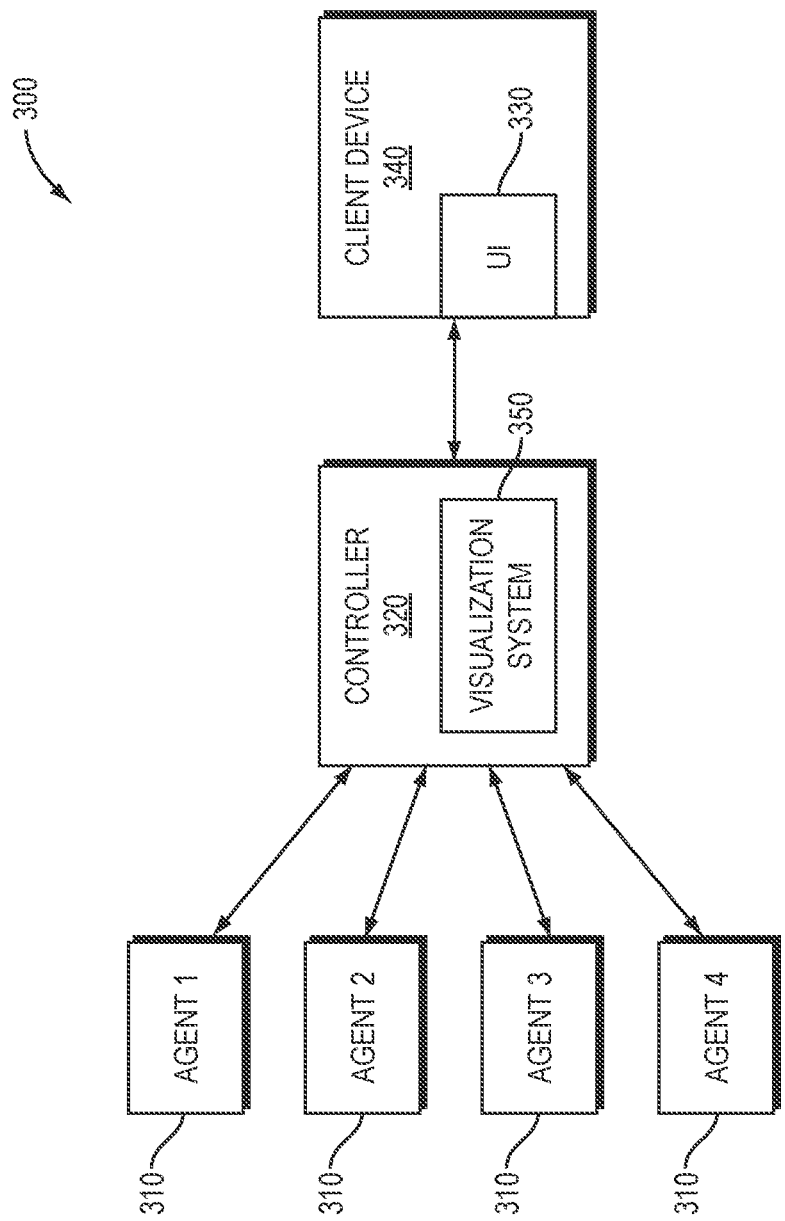
FIG. 3 illustrates an example observability intelligence platform.

FIG. 3 is a block diagram of an example observability intelligence platform 300 that can implement one or more aspects of the techniques herein. The observability intelligence platform is a system that monitors and collects metrics of performance data for a network and/or application environment being monitored. At the simplest structure, the observability intelligence platform includes one or more agents 310 and one or more servers/controllers 320. Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller(s) 320 as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page—e.g., load a shopping website, log in, search for an item, add it to the shopping cart, etc.).

The controller 320 is the central processing and administration server for the observability intelligence platform. The controller 320 may serve a browser-based user interface (UI) 330 that is the primary interface for monitoring, analyzing, and troubleshooting the monitored environment. Specifically, the controller 320 can receive data from agents 310 (and/or other coordinator devices), associate portions of data (e.g., topology, business transaction end-to-end paths and/or metrics, etc.), communicate with agents to configure collection of the data (e.g., the instrumentation/tests to execute), and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, a controller instance 320 may be hosted remotely by a provider of the observability intelligence platform 300. In an illustrative on-premises (On-Prem) implementation, a controller instance 320 may be installed locally and self-administered.

The controllers 320 receive data from different agents 310 (e.g., Agents 1-4) deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain embodiments, in the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

A business transaction, in particular, is a representation of the particular service provided by the monitored environment that provides a view on performance data in the context of the various tiers that participate in processing a particular request. That is, a business transaction, which may be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)). Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

In accordance with certain embodiments, the observability intelligence platform may use both self-learned baselines and configurable thresholds to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically is calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or business transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the eXtensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be embodied across multiple devices, on different devices, utilizing additional devices, and so on, and the views shown herein are merely simplified examples that are not meant to be limiting to the scope of the present disclosure.

—Detecting and Identifying Anomalies for Single Page Applications—

As noted above, even with the proliferation of web services, access to these web services oftentimes is still done through end user utilization of a web application (or webpage) that is connected to or in communication with the web services. Increasingly, single page applications (SPAs) may be loaded at web browsers of end user devices (e.g., desktop computers, laptops, mobile phones, etc.) for accessing the web services. An SPA is a web browser application that interacts with an end user by dynamically rewriting a current web page rather than loading entire new pages from a server. In an SPA's first load, all necessary code to construct the web application is retrieved in an initial single page load, then additional code, data, and resources can be loaded by "XMLHttpRequest" requests (XHRs). After that, page transitions will simply be content changes through XHR requests or memory state changes. Because these are not full page loads, they are generally referred to as "virtual pages" or "virtual pageviews".

Performance of such SPAs may be influenced by a multitude of architectural components (e.g., frontend software, backend servers, compression engines, etc.). Performance, though, can mainly be indicated or measured by resources on the SPAs, where a resource can be considered the most granular unit in the loading of a SPA. However, as also noted above, traditional performance traditional performance metric monitoring and root cause analysis (based on metrics gathered regarding resource data) techniques are inadequate in that they have not kept up with the newer loading behaviors of SPAs, particularly with respect to analyzing load times, completion, etc. of resources.

The techniques herein, therefore, provide for a heuristic approach to auto-detect and pinpoint root cause(s) that impact the performance of web applications based on information about one or more resources found an SPA. Such detection may be done through correlation page load speed with corresponding resource(s) on a page (e.g., an SPA). Particularly, various types of agents and their ability to measure performance (e.g., via a Page Load test or a Transaction test, as described herein above) may be leveraged to monitor page load performance, including resource download behavior. From the monitored information, a hierarchy of a web application may be constructed, for example, a hierarchy that includes pages and resources (of each page) of the web application that delineates where both pages and resources are located. Additionally, anomaly detection algorithms may be performed on the monitored information to determine or identify anomalous features regarding particular pages or resources (e.g., a slow loading page or resource(s)) of the web application). It is contemplated that synthetic data, in addition to the monitored data (from the tests performed by agents), may be used to aid in identifying anomalies. The identified anomalous features may be correlated with one of four types or categories (e.g., a page anomaly, a resource anomaly, a single domain anomaly, or a multi-domain anomaly), and one or more actionable insights that correspond to a type/category may be provided.

With more particularity regarding the anomalous feature types, a page anomaly type indicates that resources on a single page application are performing as expected according to identified trends, behaviors, etc. of the SPA (i.e., normalized behavior of the SPA). For this type of anomaly, further analysis may be performed to determine whether a frontend component (e.g., more end user facing software, hardware, etc.) is a cause or bottleneck for a page anomaly. A resource anomaly type indicates that a particular resource is not performing as expected and is a root cause of slowness in the performance of the SPA. For this type of anomaly, the particular resource may be classified into either a static or dynamic resource and further analyzed to identify pattern(s) of resource content to determine: a) whether a configuration of resource(s) has been changed (indicative of compression and/or encoding issues) or b) if one or more backend components is a cause of slowness of the particular resource. A single domain anomaly type is indicative of a particular domain (associated with a plurality of resource anomalies) not performing as expected, and, for this type of anomaly, further analyses may be performed to determine whether a content delivery network (CDN), associated with the particular domain, is misconfigured or slow. Lastly, a multi-domain anomaly type is indicative of a plurality of resources not performing as expected, and, in this case, each resource in the plurality of resources may be analyzed as a resource anomaly (as previously described).

Specifically, according to one or more embodiments described herein, a device obtains page load information corresponding to a loaded web application. The device detects, based on the page load information, an anomalous feature of the loaded web application. The device identifies a type of the anomalous feature based on a number of resource anomalies within the loaded web application, wherein the type of the anomalous feature is selected from a group consisting of: a page anomaly; a resource anomaly; and a domain anomaly. The device performs one or more mitigation actions according to the type of the anomalous feature. In one embodiment, the type of the anomalous feature is: the page anomaly when the number of resource anomalies is zero, the resource anomaly when the number of resource anomalies is one, and the domain anomaly when the number of resource anomalies is greater than one. In another embodiment, the domain anomaly is: a single domain anomaly when resource anomalies within the loaded web application belong to a particular domain, and a multi-domain anomaly when the resource anomalies belong to a plurality of domains.

Notably, as previously mentioned, the techniques herein may employ any number of machine learning techniques, such as to classify the collected data (e.g., test results of Page Load tests and/or Transaction tests) and to cluster the data as described herein. In general, machine learning is concerned with the design and the development of techniques that receive empirical data as input (e.g., collected metric/event data from agents, sensors, etc.) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function is a function of the number of misclassified points. The learning process then operates by adjusting the parameters a, b, c such that the number of misclassified points is minimal. After this optimization/learning phase, the techniques herein can use the model M to classify new data points. Often, M is a statistical model, and the cost function is inversely proportional to the likelihood of M, given the input data.

One class of machine learning techniques that is of particular use herein is clustering. Generally speaking, clustering is a family of techniques that seek to group data according to some typically predefined or otherwise determined notion of similarity.

Also, the performance of a machine learning model can be evaluated in a number of ways based on the number of true positives, false positives, true negatives, and/or false negatives of the model.

In various embodiments, such techniques may employ one or more supervised, unsupervised, or semi-supervised machine learning models. Generally, supervised learning entails the use of a training set of data, as noted above, that is used to train the model to apply labels to the input data. On the other end of the spectrum are unsupervised techniques that do not require a training set of labels. Notably, while a supervised learning model may look for previously seen patterns that have been labeled as such, an unsupervised model may attempt to analyze the data without applying a label to it. Semi-supervised learning models take a middle ground approach that uses a greatly reduced set of labeled training data.

Example machine learning techniques that the techniques herein can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like.

Figure 4:
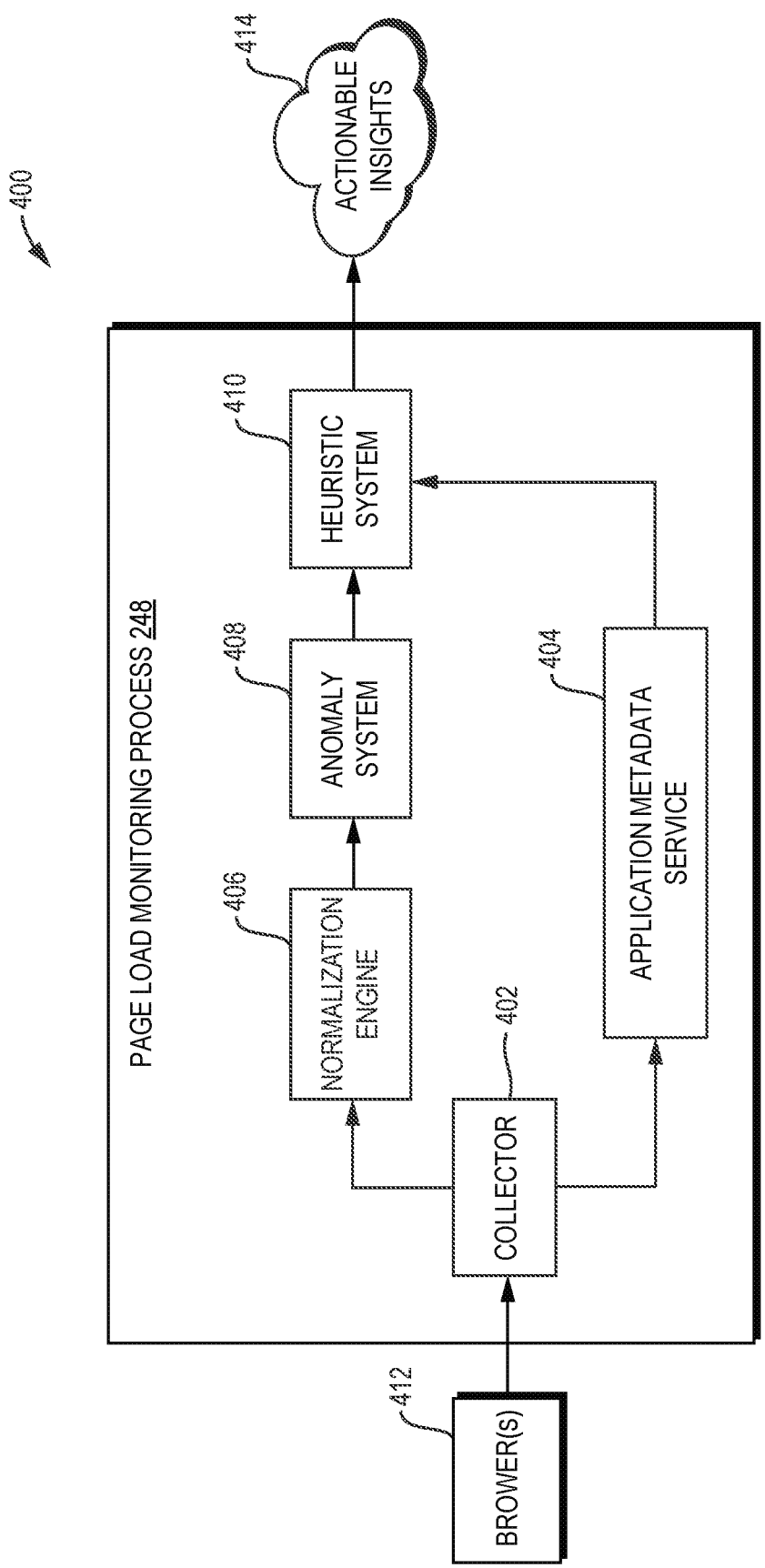
FIG. 4 illustrates an example architecture for detecting and identifying anomalies for single page applications.

Operationally, FIG. 4 illustrates an example architecture 400 for a page load monitoring service, according to various embodiments. At the core of architecture 400 is page load monitoring process 248, which may be executed by a device that provides a page load monitoring service in a network, or another device in communication therewith. As shown, page load monitoring process 248 may include any or all of the following components: collector 402, application metadata service 404, normalization engine 406, anomaly system 408, and heuristic system 410. As would be appreciated, the functionalities of these components may be combined or omitted, as desired. In addition, these components may be implemented on a singular device, for example, controller 320, or in a distributed manner, in which case the combination of executing devices can be is viewed as their own singular device for purposes of executing page load monitoring process 248.

During execution, collector 402 may operate to aggregate test results from a plurality of agents, for example, agents 310 described with respect to FIG. 3. As described herein above, such agents may be configured to perform a Page Load test that causes the agents to gather data or information indicative of one or more domains, resources, etc. that are included in a particular loading of a web application (e.g., a webpage). Additionally, the agents may perform multi-step transaction tests (e.g., a Transaction test), which, when performed, gathers similar information as that gathered from Page Load tests but from a different perspective (i.e., based on a transaction within a webpage, rather than merely the loading of a webpage). The tests performed by the agents may be performed by different types of agents that are geographically located all over the world as well as being located at different parts of internet infrastructure. For example, the agents may include endpoint agents, cloud agents, enterprise agents, etc., all of which are described in greater detail above. Collector 402 may be configured to aggregate the test results from a plurality of agents, where the tests are directed to a plurality of web applications or webpages. Collector 402 may also be configured to store the test results over a period of a time and to make the test results available to other components of page load monitoring process 248.

Collector 402 may operate to be in communication with plurality of browsers 412 at end user devices, where plurality of browsers 412 download resources (on SPAs) from different domains, for example, while accessing a web application. Using one or more resource timing application programming interfaces (APIs) and browser instrumentation that may be installed on plurality of browsers 412, resource location, timing, and size information/metrics may be gathered (e.g., start time, domain name system (DNS) time, connection time, load time, encoded size, transfer size, decoded size, etc.). Collector 402 may be configured to categorize or correlate a resource to a particular page of an SPA because collector 402, based on the gathered information, may determine start and end times of the particular page. As will be understood in the art, collector 402 may also determine visually complete times (VCTs) of particular resources on a page (or SPA). Using the determined start and end times as well as VCTs of page, collector 402 may generate page "snapshots" for visits or loadings of an SPA. It is to be understood that both real and synthetic agents (i.e., that mimic behavior of end users) may contribute to generation data used for snapshots.

Additionally, to determine a more accurate measurement of SPA end times, and thus load times (e.g., using the start times calculated above), tests performed by agents may track all of the resources loaded and rendered on an SPA page, and wait for a detected period of network inactivity. Some direct resources that may be considered include: images, scripts, and stylesheets. Other resources may also be considered, such as fonts or future types of resources, and those listed here are primary examples only. Note further that images, in particular, may also be rendered on a page after loading, and as such, the techniques herein may specifically consider both load and render time of images. "Hooks" (e.g., event loggers using a JSAgent in DOM) may be added to track any image, script, css (stylesheet), etc. added as a direct resource anytime on a page. The hooks then attach a load listener to each of these resources, such that when a load listener gets invoked, the load timestamp of that resource is noted (i.e., the time at which the resource completed loading or rendering). Accordingly, the resource having the latest/max load timestamp is the last resource to be loaded/rendered on the page.

Application metadata service 404 of architecture 400, shown in FIG. 4, may be configured to obtain the information gathered by collector 402 and generate one or more hierarchies of a web application. As will be described in greater detail herein below, a hierarchy of the web application may include pages and resources (of each page) of the web application that visually indicates and delineates where both pages and resources are located. Application metadata service 404 may additionally be configured to monitor changes to any of the hierarchies that it generates, based on new information regarding the pages and resources (e.g., that is gathered by collector 402).

Normalization engine 406 of architecture 400 may be configured to normalize snapshots and/or data gathered by agents from performing tests, as described with greater is detail above with respected to collector 402. In particular, normalization engine 406 may normalize using, for example, one or more median statistical functions to the information gathered by collector 402 for pages of a web application (e.g., Page Pa, Page Pb, etc.) to generate normalized "baseline" snapshots of each page of a web application.

Anomaly system 408 of architecture 400 is configured to compare normalized snapshots (or data) from normalization engine 406 with individual load times of web applications (for example, by agents at end user devices) to determine whether anomalous features are present for the individual load times. Further, anomaly system 408 may be configured to analyze trends of subsequent page VCTs and/or load times. In particular, normalized data may be fed into a pattern anomaly detection algorithm, for example, a median-absolute-deviation algorithm, to analyze the trends of page visual complete time and resource load time individually. Such analysis may lead to identification of page and/or resource anomalies. It is contemplated that a plurality of univariate pattern anomaly detection approaches, as understood in the art, may be implemented to detect anomalies in load times (of pages or resources).

It is contemplated that normalization engine 406 may be configured to identify snapshots and/or test results for a page loads of visits by agents to a particular webpage (or web application) over a particular number of days (e.g., 30 days) or any time period and to normalize the snapshots and/or test results. Normalization of these test results leads to determinations of expected load times, both for each SPA of the web application as well as resources on each of the SPAs. It is contemplated that machine learning techniques may be used by normalization engine 406 to implement the normalization (or even standardization) of the test results. In other words, the machine learning techniques may generate a model of expected load times for SPAs and/or resources that are loaded during visits of a particular web application, where the model may be used compare subsequent loads of the web application to determine whether any anomalous load times are present.

Heuristic system 410 of architecture 400 may be configured to obtain one or more page or resource anomalies identified by anomaly system 408 and co-relate the anomalies is between pages and resources. Notably, heuristic system 410 may do so using information gathered by collector 402 and application metadata service 404. In particular, after anomaly system 408 identifies that a page or resource has an anomalous feature, heuristic system 410 may categorize it into one of the following types:

1. "zero resource anomaly" that indicates a page has an anomaly but that none of the resources on the page have anomalies;
2. "one/single resource anomaly" that indicates the page has an anomaly and that only one resource on the page has an anomaly;
3. "N resource anomaly belonging to the same domain" (e.g., a single domain anomaly) that indicates the page has an anomaly and that multiple resources have anomalies, where the multiple resources are loaded from the same domain; or
4. "N resources anomaly belonging to the different domains" (e.g., a multi-domain anomaly) that indicates that the page has an anomaly and that multiple resources have anomalies, where the multiple resources are loaded from different domains.

Post categorization (i.e., identification of a type for identified anomalous features), diverse heuristics may be applied to extract actionable insights 414 from each of the aforementioned types. In particular, for a zero resource anomaly, actionable insights 414 may include an analysis of one or more trends of resource counts per page for the page that exhibits the anomaly may be performed to detect whether the page anomaly is because of a change in the page itself or front-end code slowness. This analysis may be based on, for example, information gathered by collector 402 and application metadata service 404.

For a one resource anomaly type, actionable insights 414 may preliminarily include determining whether the resource that exhibits the anomaly is a static resource (e.g., an image file, a cascading style sheet (CSS), etc.) or a dynamic resource (e.g., an XHR request). In the case of the resource anomaly being a static resource, an analysis of one or more trends regarding a size of the resource over time may be performed to determine whether the resource has changed on a server (that hosts the file) or the is anomaly is due to problems, issues, etc. with a compression/decompression system or a resource encoding system associated with resource. It is contemplated that an accurate conclusion may be reached based on a change in an encoding size of the resource, even though the decoding size remains unchanged. In the case of the resource anomaly being a static resource, an analysis may be performed, using synthetic user data, that determines whether the resource anomaly is due to backend slowness, issues, etc. based on observations of one or more trends of the resource anomaly's encoded size, decoded size, and load-time.

For a single domain anomaly type, actionable insights 414 may include an analysis one or more DNS time trends of resources belonging to the impacted domain, where such analysis determines whether there is a degradation in a CDN or a backend server of the single domain.

For a multi-domain anomaly type, actionable insights 414 may include rules for categorizing the resources based on the individual domains (or resources), such that the multi-domain anomaly may be sub-divided into, for example, a one resource anomaly type or single domain anomaly type. Afterwards, analysis of these sub-divisions may be performed as described above herein.

In an embodiment, in addition to anomaly system 408 being configured to relay detected anomalous features to heuristic system 410, anomaly system 408 may be configured to react to and/or mitigate any anomalous features, such as to automatically flag and report anomalous features via a notification (e.g., an alert) to operators of web applications or end-user devices that have visited a particular web application. In an embodiment, anomaly system 408 may be configured to automatically block, remove, or revert, anomalous features from a loading of a web application. In another embodiment, anomaly system 408 may be configured to feed identified anomalous features into firewalls of associated devices (e.g., in networks and/or sub-networks where agents 310 are installed), where doing so results in termination of active TLS connections with the anomalous features, for example.

Anomaly system 408 may also be configured to generate a variety of graphical user interface-based (GUI-based) images and/or maps that indicate locations of anomalous features. For example, geographic locations may be correlated with anomalous features and may be displayed in a heat map (e.g., a global view) that indicates physical locations of the anomalous features. Additional information that may be displayed in the heat map included a number of anomalous features, where an excess amount, as understood in the art, may indicate an internet-based attack.

Figure 5:
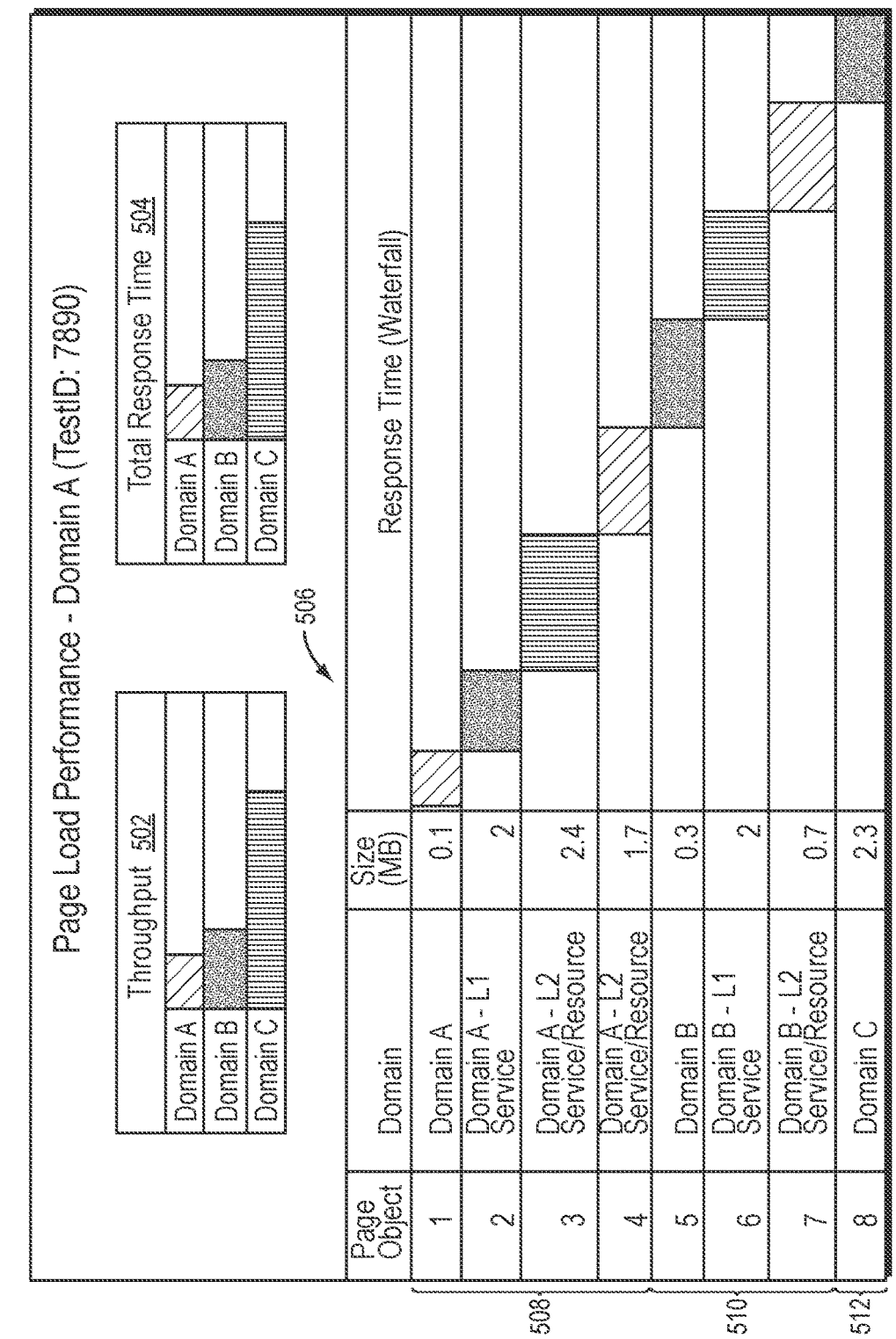
FIG. 5 illustrates example test results of a load test performed by an agent.

Turning now to FIG. 5, example test results 500 of a load test performed by an agent are shown. In particular, an agent may perform a load test (as shown, TestID: 7890) that is configured to test a variety of parameters for a visit by the agent to a particular web application or SPA, which is shown as "Domain A" in FIG. 5. Such parameters may include throughput and response time, which are indicated by corresponding throughput pane 502 and total response time pane 504. Throughput pane 502 includes throughputs to Domain A, Domain B, and Domain C, which were all loaded during the visit by the agent to Domain A. Total response time pane 504 includes the response times for each of Domain A, Domain B, and Domain C during the visit by the agent to Domain A.

Test results 500 may also include a waterfall view pane 506, which in addition to displaying each of the domains visited during a loading (e.g., page load) of a visit to Domain A, also displays each of services that may be at sub-levels of domains that were loaded during in temporal order of the agent's visit to Domain A. Notably, waterfall view pane 506 indicates that the agent loaded particular resources/services 508 of Domain A then particular resources/services 510 of Domain B then particular resources/services 512 of Domain C. For each of these services 508-512, waterfall view pane 506 may include a corresponding identifier, file size, and specific response time.

While the test results 500 are shown indicating that various levels of domains are being tracked (e.g., a first level and a second level), it is contemplated that tests performed by the agents may be configured to only higher (or even further lower) levels. In other words, various limitations may be placed herein on the level of domains being tracked, meaning second level domains and third level domains, and so on.

FIG. 6 illustrates example snapshots 600 that are indicative of loadings of single page applications of a web application. Snapshots 600 may be collected by collector 402 from browsers 412 as described above with respect to FIG. 4. In the example snapshots 600 shown, "Sample 1" 602 and "Sample 2" 604 are snapshots generated for a page of a web application, Page Pa, at a same time, T1. "Sample 1" 602 and "Sample 2" 604, however, may be assumed to have data indicative of visits by different users. Further, "Sample 3" 606 may be a snapshot generated for a different page of the web application, Page Pb, at time, T2. Each of the samples 602-606 may have corresponding page details 608 (regarding load times and VCTs of a page) and resource details 610 (regarding DNS times, connection times, and load times of resources on the page). For instance, for "Sample 1" 602, data may be gathered by collector 402 which indicates that it has a VCT of Pa1_VCT and a load time of Pa1_LT in a corresponding field page detail field 612. Collector 402 may have also gathered data that indicates that Page Pa includes fields for Resource Pa_Ra 614, Resource Pa_Rb 616, and Resource Pa_Rc 616. Each of the fields for the resources may indicate a DNS time, connection time, and a load time for a corresponding resource.

Figure 7:
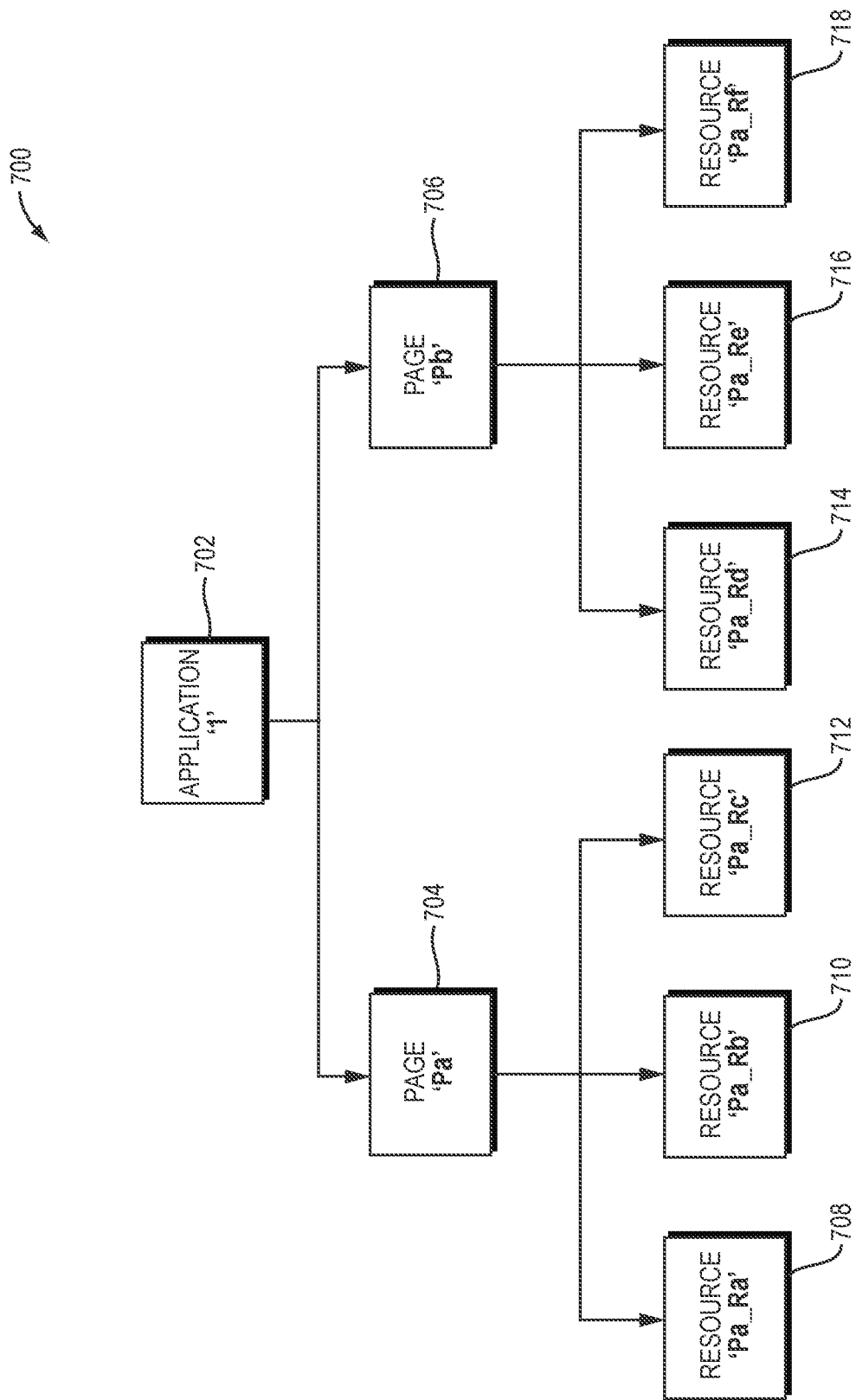
FIG. 7 illustrates an example hierarchy of a web application.

An example hierarchy 700 is shown in FIG. 7 for a particular web application 702. As described herein above, application metadata service 404 may be configured to generated hierarchy 700, for example, based on the information indicated in snapshots 600. In FIG. 7, particular web application 702 ("1") may have indications for Page Pa 704 and Page Pb 706. Further, Page Pa 704 may have resources indicated in the hierarchy 700: Resource Pa_Ra 708, Resource Pa_Rb 710, and Resource Pa_Rc 712. Page Pb resources indicated in the hierarchy 700: Resource Pb_Rd 714, Resource Pb_Re 716, and Resource Pb_Rf 718. Application metadata service 404 may additionally be configured to monitor changes to hierarchy 700 and to periodically update it, accordingly.

FIG. 8 illustrates an example normalized snapshot 800 of a page of a web application. Normalized snapshot 800 may be generated by normalization engine 406, in part, based on snapshots 600. In the example, "Normalized Snapshot 1" 802 may include is page detail field, which includes normalized values (e.g., median) each of pages available on the web application, shown as Pages Pa-Pb 804. Additionally, a resource field 804 may include normalized values for resources available on each of Pages Pa-Pb 804. In particular, there may be normalized values for Resource Pa_Ra 806, Resource Pa_Rb 808, Resource Pa_Rc 810, all the way to a Resource Pa_R[n] 812. Anomaly system 408 may utilize normalized snapshot 800 to compared subsequent loadings of a web application, SPA(s) of the web application, or resource(s) in the SPA(s) to determine whether the subsequent loadings include anomalous feature (e.g., in load times). For example, as shown in FIG. 8, different pages (e.g., Page Pa, Page Pb, etc.) or particular resources (e.g., Pa_Ra, Pa_Rb, etc.) may be compared by anomaly system 408. In another example, Pa_nVCT time is fed to anomaly system 408 to detect anomalous features by comparing it against its historical data, and Ra_nLT may be fed to anomaly system 408 to detect anomalies in load time of resource Pa_Ra.

Figure 9A:
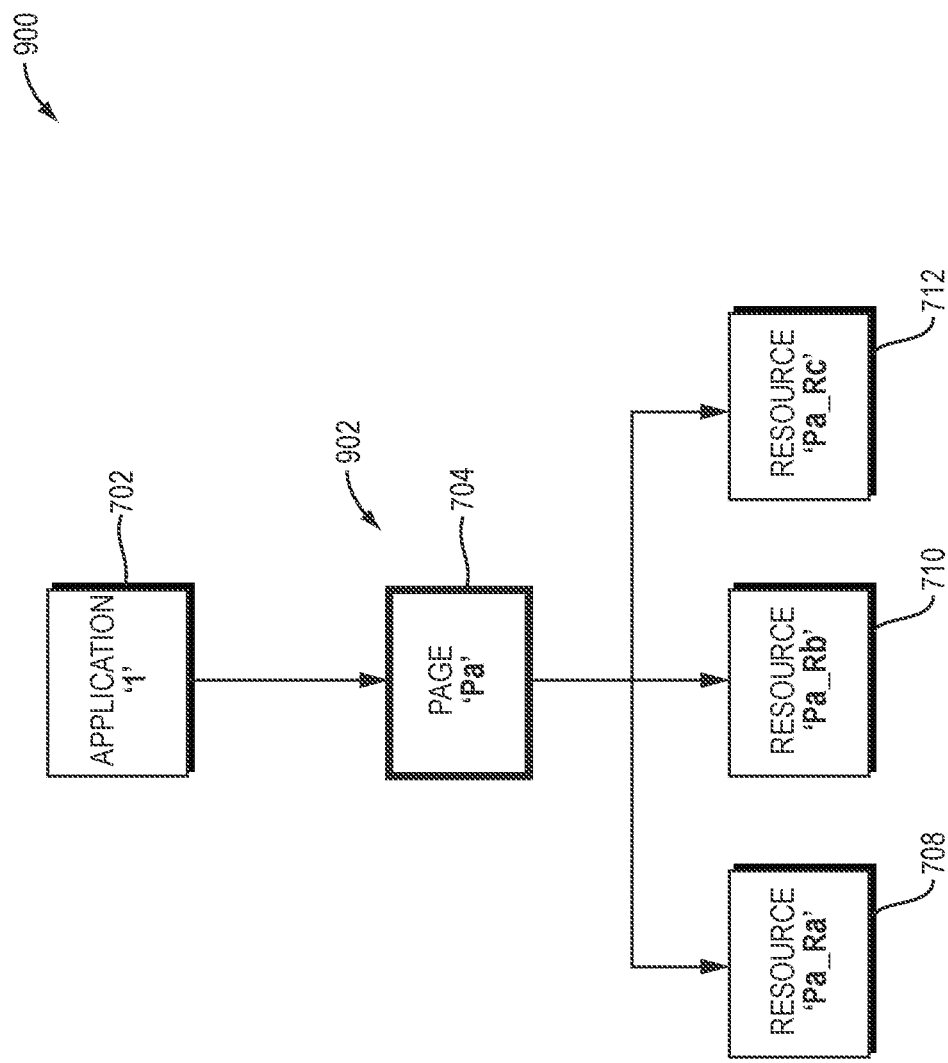
FIGS. 9A-9D illustrate examples of types of anomalous features.
Figure 9B:
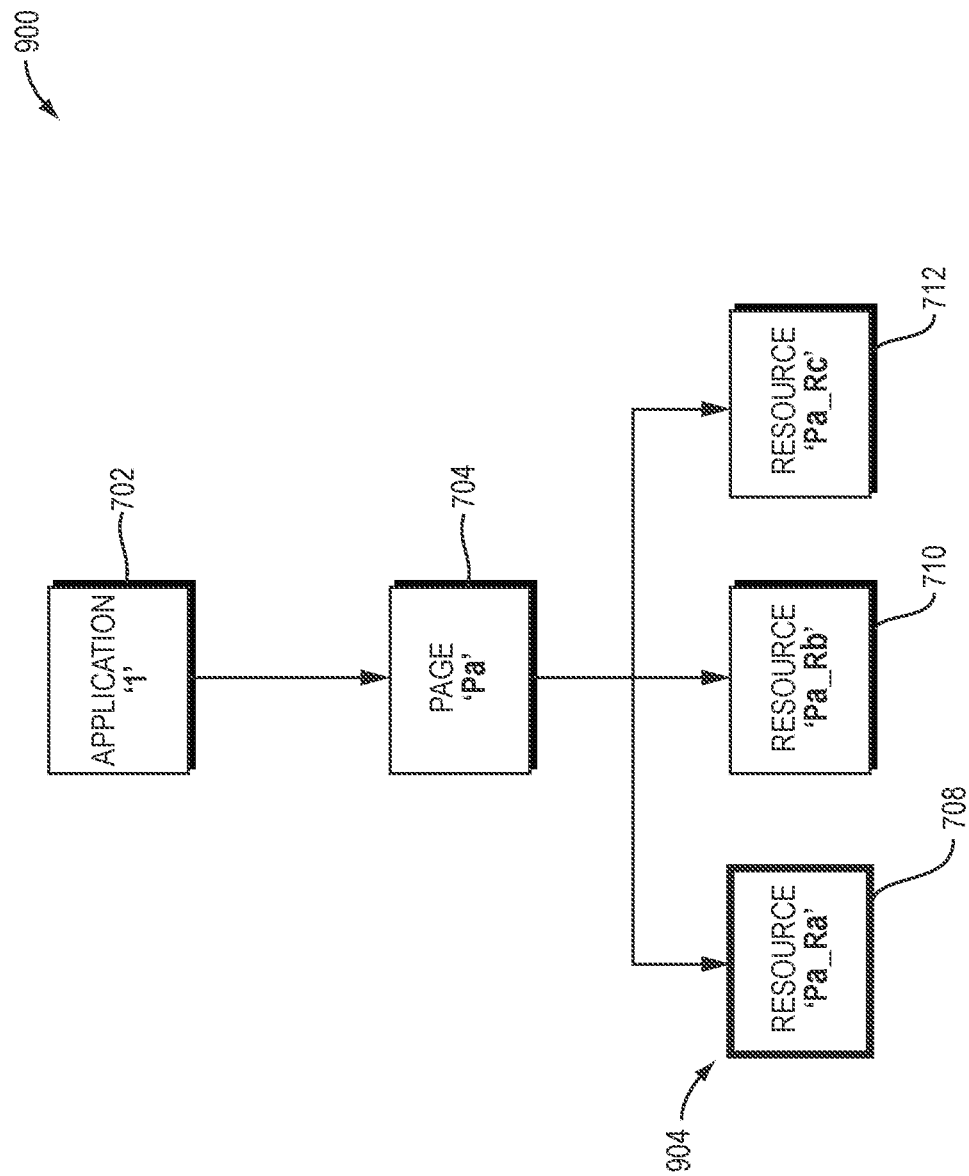

With reference to FIGS. 9A-9D, examples of types of anomalous features are shown. In FIG. 9A, example hierarchy 900 is shown, where shading 902 for Page Pa 704 indicates that there is a detected page anomaly present with Page Pa 704. Such page anomaly is indicative of there being zero resource anomalies, and this anomaly may be treated as a zero resource anomaly type according to actionable insights 414. In FIG. 9B, example hierarchy 900 is shown, where shading 904 for Resource Pa_Ra 708 indicates that there is a detected resource anomaly present within Page Pa 704. Because this anomaly is only present with one resource, it may be treated as a one resource anomaly according to actionable insights 414.

Figure 9C:
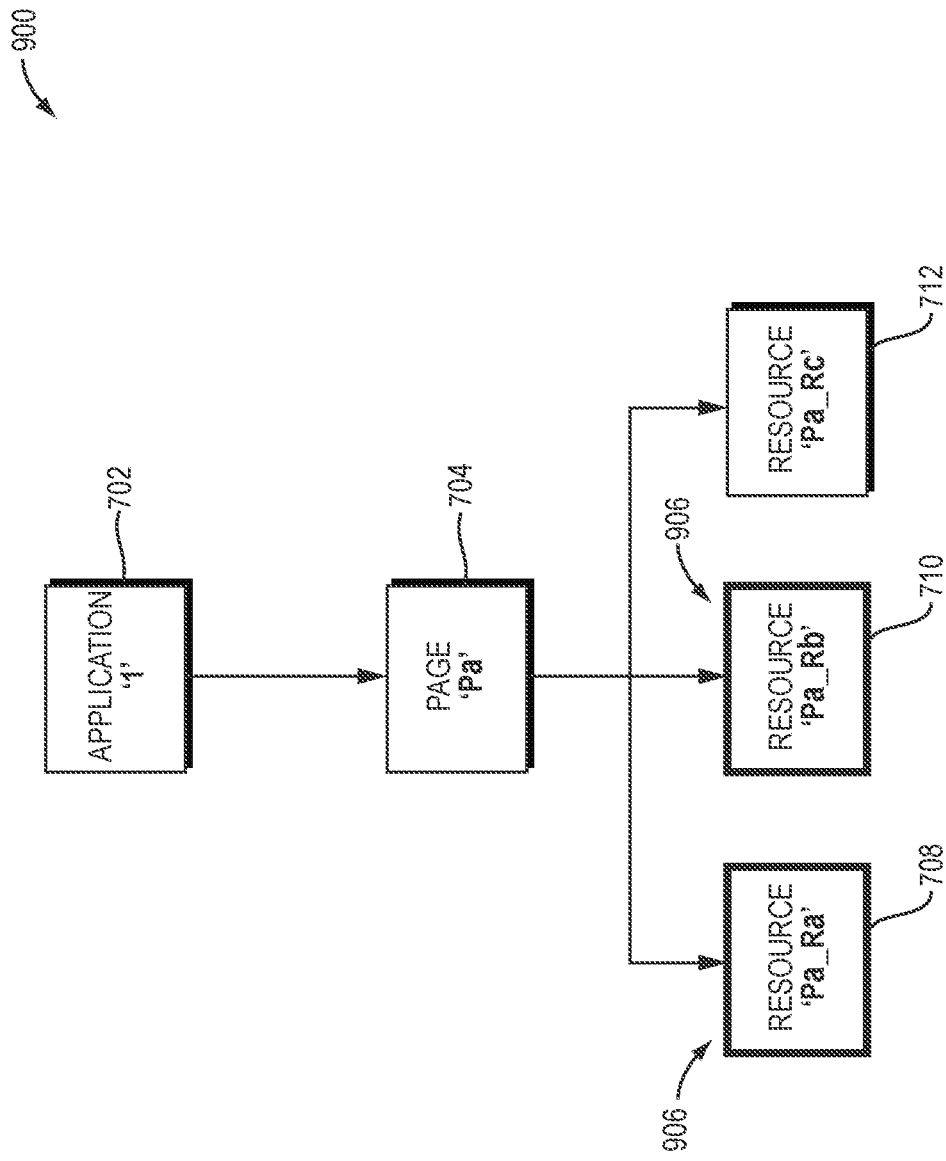

In FIG. 9C, example hierarchy 900 is shown, where shading 906 indicates that there are detected resource anomalies for Resource Pa_Ra 708 and Resource Pa_Rb 710. Since shading 906 is of the same kind, it indicates that resource anomalies detected for Resource Pa_Ra 708 and Resource Pa_Rb 710 are from a same domain. The resource anomalies indicated in FIG. 9C, then, may be treated as a single domain anomaly according to actionable insights 414.

Figure 9D:
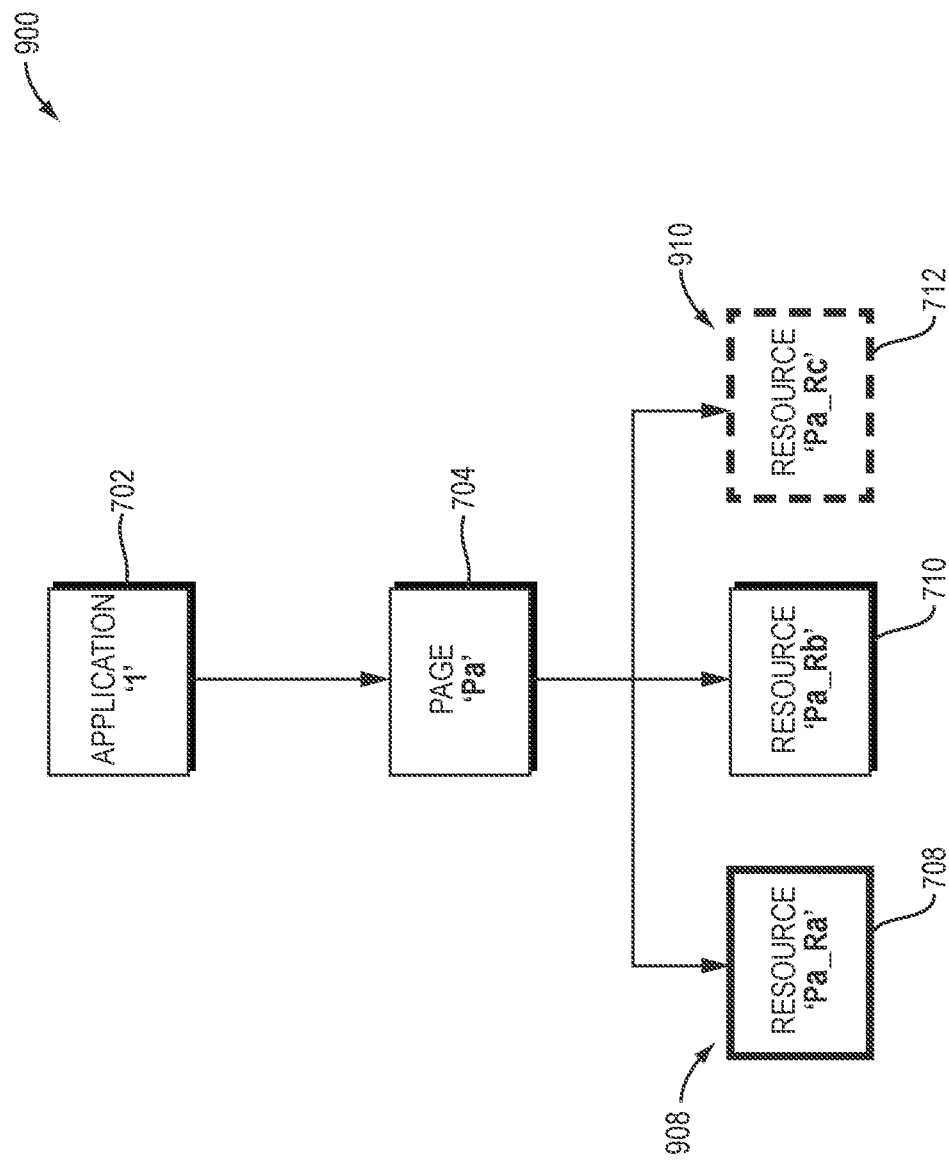

In FIG. 9D, example hierarchy 900 is shown, where shading 908 and shading 910 indicate that there are detected resource anomalies for Resource Pa_Ra 708 and Resource Pa_Rc 712. The difference in shading 908 and shading 910 indicate that the resource anomalies detected for Resource Pa_Ra 708 and Resource Pa_Rc 712 are from different domains. The resource anomalies indicated in FIG. 9D, then, may be treated as a multi-domain anomaly according to actionable insights 414.

Additionally, heuristic system 410 may cause an example anomaly detection notification 1000, such as the example shown in FIG. 10, to be generated and displayed at an end-user device in response to the detection of the anomalous pages or resources. Anomaly detection notification 1000 may include an identifier of the particular test that was performed (as shown, TestID: 1234) as well as indications of the nature of the anomalous pages and/or resources (e.g., the address of the domain, type of loaded object from the domain, and a categorization of the anomalous domain).

Figure 11:
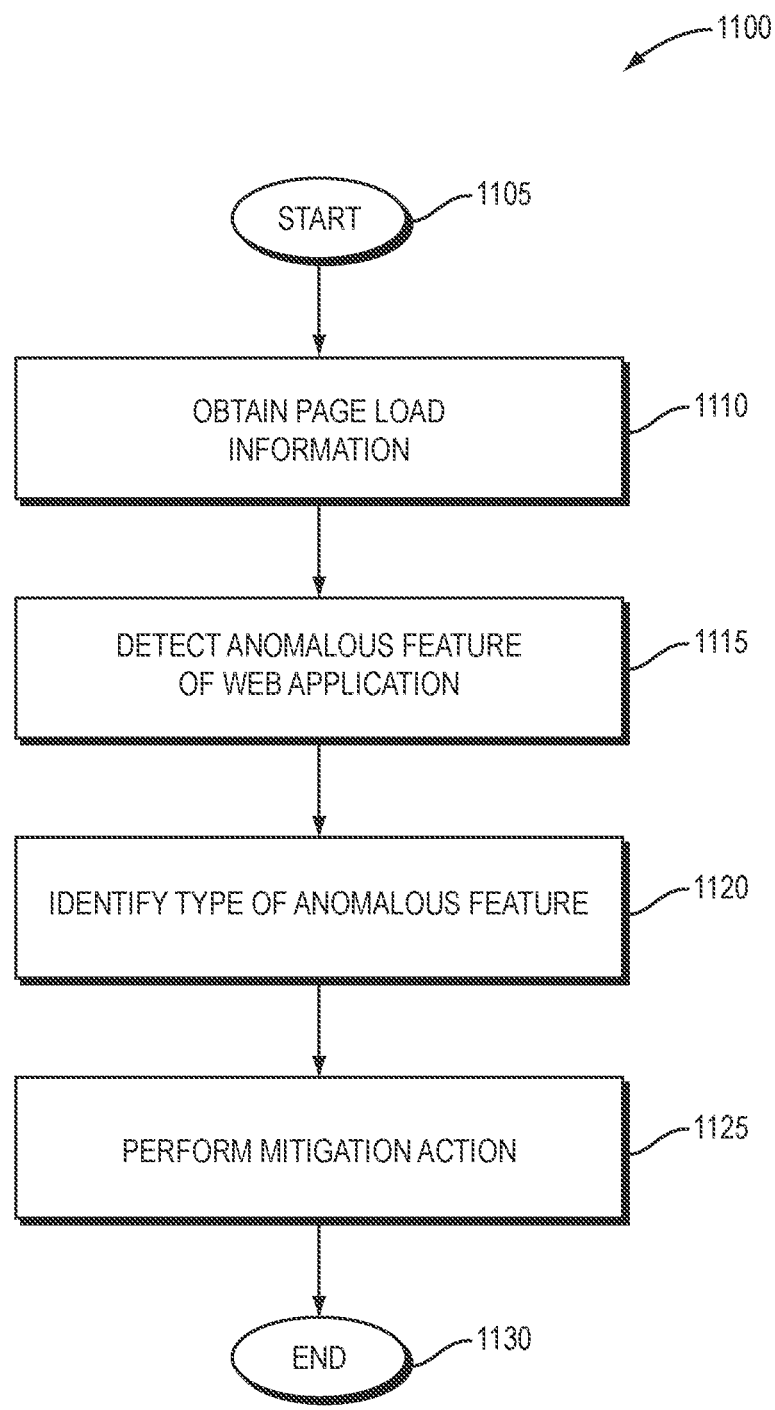
FIG. 11 illustrates an example simplified procedure for detecting and identifying anomalies for single page applications in accordance with one or more embodiments described herein.

In closing, FIG. 11 illustrates an example simplified procedure for detecting and identifying anomalies for single page applications in accordance with one or more embodiments described herein, particularly from the perspective of either an edge device or a controller. For example, a non-generic, specifically configured device (e.g., device 200, particularly a monitoring device) may perform procedure 1100 by executing stored instructions (e.g., page load monitoring process 248). The procedure 1100 may start at step 1105, and continues to step 1110, where, as described in greater detail above, a device may obtain page load information corresponding to a loaded web application.

At step 1115, the device may detect, based on the page load information, an anomalous feature of the loaded web application (e.g., based on one or more baselines, expectations, and so on, as described above). In an embodiment, the page load information may comprise a page load time of a page of the loaded web application. In an embodiment, the page load information may comprise a resource load time of a resource from a page of the loaded web application.

At step 1120, the device may identify a type of the anomalous feature based on a number of resource anomalies within the loaded web application, wherein the type of the anomalous feature is selected from a group consisting of: a page anomaly; a resource anomaly; and a domain anomaly. In an embodiment, the type of the anomalous feature may be: the page anomaly when the number of resource anomalies is zero, the resource anomaly when the number of resource anomalies is one, and the domain anomaly when the number of resource anomalies is greater than one. In another embodiment, the domain anomaly may be: a single domain anomaly when resource anomalies within the loaded web application belong to a particular domain, and a multi-domain anomaly when the resource anomalies belong to a plurality of domains.

At step 1125, the device may one or more mitigation actions according to the type of the anomalous feature. In an embodiment, the one or more mitigation actions may comprise causing a graphical user interface to display an indication of the type of the anomalous feature at an end-user device.

The simplified procedure 1100 may then end in step 1130, notably with the ability to continue ingesting and processing page load data for further anomalies. Other steps may also be included generally within procedure 1100. For example, such steps (or, more generally, such additions to steps already specifically illustrated above), may include: aggregating, by the device, page load information corresponding to the loaded web application; and determining, by the device, one or more baselines of expected page load times for the loaded web application, wherein detecting, by the device and based on the page load information, the anomalous feature of the loaded web application is further based on the one or more baselines of expected page load times; generating, by the device and based on the page load information, a hierarchy of the loaded web application; and so on.

It should be noted that while certain steps within procedure 1100 may be optional as described above, the steps shown in FIG. 11 are merely examples for illustration, and certain other steps may be included or excluded as desired. Further, while a particular order of the steps is shown, this ordering is merely illustrative, and any suitable arrangement of the steps may be utilized without departing from the scope of the is embodiments herein.

The techniques described herein, therefore, provide for detecting and identifying anomalies for single page applications. In particular, the techniques herein provide the ability to categorize or group page anomalies and/or resource anomalies of a web application into types of anomalies: a page anomaly; a resource anomaly; and a domain anomaly (single domain or multi-domain). Based on the type of anomaly, one or more actionable insights may be identified, using heuristics described herein, to address various kinds of roots causes of anomalies that may occur with respect to SPAs. (i.e., to identify one or more mitigation actions). Notably, bottlenecks like poorly performing compression engines, CDNs (or domains), frontend code issues, backend server issues, etc. may be identified, based on the analysis of page load performance as described herein.

Illustratively, the techniques described herein may be performed by hardware, software, and/or firmware, such as in accordance with the illustrative page load monitoring process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.). In addition, the components herein may be implemented on a singular device or in a distributed manner, in which case the combination of executing devices can be viewed as their own singular "device" for purposes of executing the page load monitoring process 248.

According to the embodiments herein, an illustrative method herein may comprise: obtaining, at a device, page load information corresponding to a loaded web application; detecting, by the device and based on the page load information, an anomalous feature of the loaded web application; identifying, by the device, a type of the anomalous feature based on a number of resource anomalies within the loaded web application, wherein the type of the anomalous feature is selected from a group consisting of: a page anomaly; a resource anomaly; and a domain anomaly; and performing, by the device, one or more mitigation actions according to the type of the anomalous feature.

In one embodiment, the type of the anomalous feature is: the page anomaly when resource anomalies is one, and the domain anomaly when the number of resource anomalies is greater than one. In one embodiment, the domain anomaly is: a single domain anomaly when resource anomalies within the loaded web application belong to a particular domain, and a multi-domain anomaly when the resource anomalies belong to a plurality of domains. In one embodiment, the method may further comprise the method further comprise: aggregating, by the device, page load information corresponding to the loaded web application; and determining, by the device, one or more baselines of expected page load times for the loaded web application. In one embodiment, detecting, by the device and based on the page load information, the anomalous feature of the loaded web application is further based on the one or more baselines of expected page load times. In one embodiment, the method may further comprise: generating, by the device and based on the page load information, a hierarchy of the loaded web application In one embodiment, the page load information comprises a page load time of a page of the loaded web application. In one embodiment, the page load information comprises a resource load time of a resource from a page of the loaded web application. In one embodiment, the one or more mitigation actions comprises causing a graphical user interface to display an indication of the type of the anomalous feature at an end-user device. In one embodiment, the page load information is obtained from an agent selected from a group consisting of: a cloud agent, an enterprise agent, and an endpoint agent.

According to the embodiments herein, an illustrative tangible, non-transitory, computer-readable medium herein may have computer-executable instructions stored thereon that, when executed by a processor on a computer, may cause the computer to perform a method comprising: obtaining page load information corresponding to a loaded web application; detecting, based on the page load information, an anomalous feature of the loaded web application; identifying a type of the anomalous feature based on a number of resource anomalies within the loaded web application, wherein the type of the anomalous feature is selected from a group consisting of: a page anomaly; a resource is anomaly; and a domain anomaly; and performing one or more mitigation actions according to the type of the anomalous feature.

Further, according to the embodiments herein an illustrative apparatus herein may comprise: one or more network interfaces to communicate with a network; a processor coupled to the network interfaces and configured to execute one or more processes; and a memory configured to store a process that is executable by the processor, the process, when executed, configured to: obtain page load information corresponding to a loaded web application; detect, based on the page load information, an anomalous feature of the loaded web application; identify a type of the anomalous feature based on a number of resource anomalies within the loaded web application, wherein the type of the anomalous feature is selected from a group consisting of: a page anomaly; a resource anomaly; and a domain anomaly; and perform one or more mitigation actions according to the type of the anomalous feature.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments of particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller" or "by a collection engine", those skilled in the art will appreciate that agents of the observability intelligence platform (e.g., application agents, network agents, language agents, etc.) may be considered to be extensions of the server (or controller/engine) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, endpoint agents, enterprise agents, cloud agents, etc.), the techniques may be generally applied to any suitable software/hardware configuration (libraries, modules, etc.) as part of an apparatus, application, or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
   obtaining, at a device, page load information corresponding to a loaded web application;
   detecting, by the device and based on the page load information, an anomalous feature of the loaded web application;
   identifying, by the device, a type of the anomalous feature based on a number of resource anomalies within the loaded web application, wherein the type of the anomalous feature is one of: a page anomaly when the number of resource anomalies is zero, a resource anomaly when the number of resource anomalies is one, or a domain anomaly when the number of resource anomalies is greater than one; and
   performing, by the device, one or more mitigation actions according to the type of the anomalous feature.

2. The method as in claim 1, wherein the domain anomaly is:
   a single domain anomaly when resource anomalies within the loaded web application belong to a particular domain, and
   a multi-domain anomaly when the resource anomalies belong to a plurality of domains.

3. The method as in claim 1, the method further comprising:
   aggregating, by the device, page load information corresponding to the loaded web application; and
   determining, by the device, one or more baselines of expected page load times for the loaded web application.

4. The method as in claim 3, wherein detecting, by the device and based on the page load information, the anomalous feature of the loaded web application is further based on the one or more baselines of expected page load times.

5. The method as in claim 1, the method further comprising:
   generating, by the device and based on the page load information, a hierarchy of the loaded web application.

6. The method as in claim 1, wherein the page load information comprises a page load time of a page of the loaded web application.

7. The method as in claim 1 wherein the page load information comprises a resource load time of a resource from a page of the loaded web application.

8. The method as in claim 1, wherein the one or more mitigation actions comprises causing a graphical user interface to display an indication of the type of the anomalous feature at an end-user device.

9. The method as in claim 1, wherein the page load information is obtained from an agent selected from a group consisting of: a cloud agent, an enterprise agent, and an endpoint agent.

10. A tangible, non-transitory, computer-readable medium having computer-executable instructions stored thereon that, when executed by a processor on a computer, cause the computer to perform a method comprising:
    obtaining page load information corresponding to a loaded web application;
    detecting, based on the page load information, an anomalous feature of the loaded web application;
    identifying a type of the anomalous feature based on a number of resource anomalies within the loaded web application, wherein the type of the anomalous feature is one of: a page anomaly when the number of resource anomalies is zero, a resource anomaly when the number of resource anomalies is one, or a domain anomaly when the number of resource anomalies is greater than one; and
    performing one or more mitigation actions according to the type of the anomalous feature.

11. The tangible, non-transitory, computer-readable medium as in claim 10, wherein the domain anomaly is:
    a single domain anomaly when resource anomalies within the loaded web application belong to a particular domain, and
    a multi-domain anomaly when the resource anomalies belong to a plurality of domains.

12. The tangible, non-transitory, computer-readable medium as in claim 10, wherein the method further comprises:
    aggregating page load information corresponding to the loaded web application; and
    determining one or more baselines of expected page load times for the loaded web application.

13. The tangible, non-transitory, computer-readable medium as in claim 12, wherein detecting, based on the page load information, the anomalous feature of the loaded web application is further based on the one or more baselines of expected page load times.

14. The tangible, non-transitory, computer-readable medium as in claim 10, wherein the method further comprises:
    generating, based on the page load information, a hierarchy of the loaded web application.

15. The tangible, non-transitory, computer-readable medium as in claim 10, wherein the page load information comprises a page load time of a page of the loaded web application.

16. The tangible, non-transitory, computer-readable medium as in claim 10, wherein the page load information comprises a resource load time of a resource from a page of the loaded web application.

17. The tangible, non-transitory, computer-readable medium as in claim 10, wherein the one or more mitigation actions comprises causing a graphical user interface to display an indication of the type of the anomalous feature at an end-user device.

18. An apparatus, comprising:
- one or more network interfaces to communicate with a network;
- a processor coupled to the one or more network interfaces and configured to execute one or more processes; and
- a memory configured to store a process that is executable by the processor, the process, when executed, configured to:
  - obtain page load information corresponding to a loaded web application;
  - detect, based on the page load information, an anomalous feature of the loaded web application;
  - identify a type of the anomalous feature based on a number of resource anomalies within the loaded web application, wherein the type of the anomalous feature is one of: a page anomaly when the number of resource anomalies is zero, a resource anomaly when the number of resource anomalies is one, or a domain anomaly when the number of resource anomalies is greater than one; and
  - perform one or more mitigation actions according to the type of the anomalous feature.

\* \* \* \* \*